United States Patent
Kuipers et al.

(10) Patent No.: US 6,852,307 B1
(45) Date of Patent: Feb. 8, 2005

(54) CATALYTIC OXIDATION PROCESS WITH FLOW CONTROL SYSTEM

(75) Inventors: Herman Pieter Charles Eduard Kuipers, Amsterdam (NL); Hendrik Martinus Wentinck, Amsterdam (NL)

(73) Assignee: Shell Oil Company, Houston, TX (US)

( * ) Notice: Subject to any disclaimer, the term of this patent is extended or adjusted under 35 U.S.C. 154(b) by 235 days.

(21) Appl. No.: 10/070,213

(22) PCT Filed: Aug. 29, 2000

(86) PCT No.: PCT/EP00/08441

§ 371 (c)(1),
(2), (4) Date: Feb. 27, 2002

(87) PCT Pub. No.: WO01/16022

PCT Pub. Date: Mar. 8, 2001

(30) Foreign Application Priority Data

Aug. 31, 1999 (EP) .............................................. 99306900

(51) Int. Cl.[7] .............................. C01B 3/38; B60K 1/00
(52) U.S. Cl. .................... 423/651; 180/65.1; 180/65.3; 252/373; 423/418.2
(58) Field of Search ............................. 180/65.1, 65.3; 252/373; 423/418.2, 648.1, 651

(56) References Cited

U.S. PATENT DOCUMENTS

| 4,789,540 A | 12/1988 | Jenkins |
| 5,939,025 A | 8/1999 | Ahmed et al. |
| 5,942,346 A * | 8/1999 | Ahmed et al. ................. 429/20 |

FOREIGN PATENT DOCUMENTS

| EP | 0 629 578 | 12/1994 | ............. C01B/3/40 |
| JP | 04 160003 | 6/1992 | ............. C01B/3/56 |

OTHER PUBLICATIONS

Michalski et al., Temperature Measurement, 2nd Edition, John Wiley & Sons Ltd, pp. 209–228, 2001.*
Perry et al., Perry's Chemical Engineer's Handbook, 7th Edition McGraw–Hill, pp. 8–65 to 8–84, 1997.*
Recupero. V et al: "Hydrogen generator, via catalytic partial oxidation of methane for fuel cells" Journal of Power Sources. Ch. Elsevier Sequoia S.A. Lausanne. vol. 71, No. 1–2 p. 208–214.

* cited by examiner

*Primary Examiner*—Stanley S. Silverman
*Assistant Examiner*—Maribel Medina

(57) ABSTRACT

A process for the catalytic oxidation of a hydrocarbonaceous fuel into a conversion product, wherein a feed mixture comprising the fuel and an oxygen-containing gas is contacted with a catalyst bed, comprising the steps of: (a) setting the flow rate of the fuel and flow rate of the oxygen-containing gas, (b) determining the actual temperature of the upstream surface of the catalyst bed by mans of a quick response device; and (c) generating an output signal that is a function of the difference between the actual temperature and a set point for the temperature; and using the output signal to adjust the flow rate of the fuel and/or of the oxygen-containing gas.

8 Claims, 2 Drawing Sheets

CATALYTIC OXIDATION PROCESS WITH FLOW CONTROL SYSTEM

Figure 1:
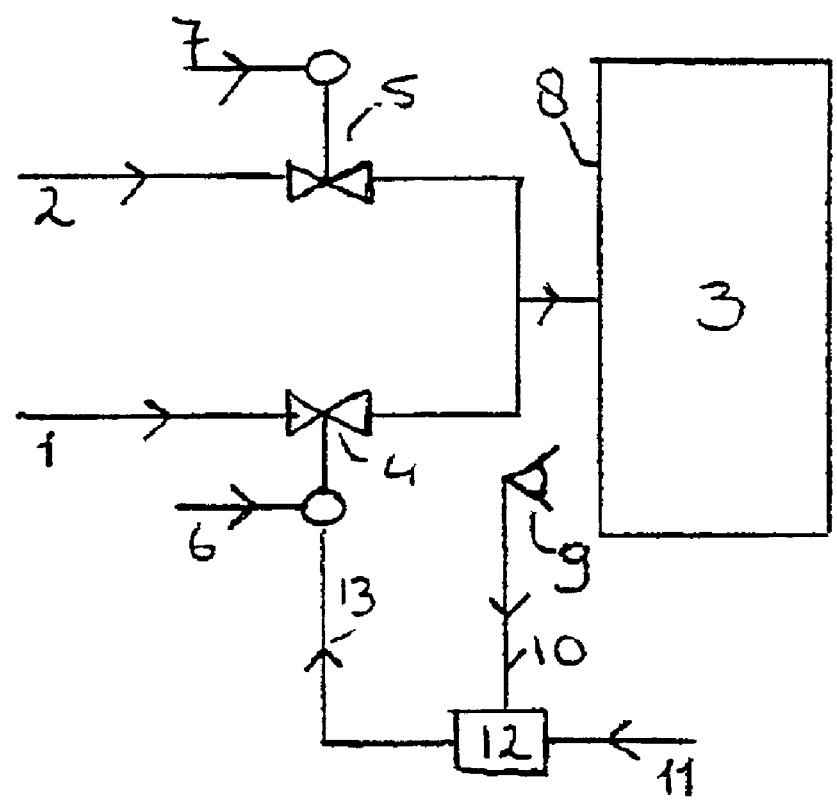

The present invention relates to a process for the catalytic oxidation of a hydrocarbonaceous fuel and to transport means comprising a system for the catalytic partial oxidation of a fuel that is operated according to such a process.

Catalytic oxidation processes such as catalytic partial oxidation processes, wherein a feed mixture comprising a hydrocarbonaceous fuel and an oxygen-containing gas are contacted with a catalyst are known in the art. The partial oxidation of a hydrocarbonaceous fuel, in particular hydrocarbons, in the presence of a catalyst is an attractive route for the preparation of mixtures of carbon monoxide and hydrogen. It is an exothermic reaction represented by the equation:

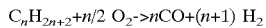

$$C_nH_{2n+2} + n/2\ O_2 \rightarrow nCO + (n+1)\ H_2$$

There is literature in abundance on the catalysts and the process for the catalytic partial oxidation of hydrocarbons. Reference is made, for instance, to US ,149,464, EP 576 096, EP 629 578, and WO 99/19249.

Such catalytic oxidation processes are susceptible to changes in the oxygen/carbon ratio in the feed mixture which has a direct influence on the reaction temperature. Since even a slight deviation from the desired ratio may shorten the life of the oxidation catalyst employed, there is a need to be able to measure the oxygen/carbon ratio or the flow rates of the oxygen-containing gas and the fuel accurately. In processes which operate under conditions which include changes, in particular frequent changes in the demand of the conversion product, and thus in throughput of the reactants, there is also a need to measure the oxygen/carbon ratio or the flow rates of the reactants very quickly. For instance, in the case of catalytic partial oxidation processes which are directed at producing hydrogen which is to be used as feedstock for a fuel cell as envisaged in hydrogen-operated motor cars, there will be a need for rapid and sometimes frequent decreases and increases in the flow of hydrogen to the fuel cell depending on the requirements of the motorist. Accordingly, the flow rates of fuel and oxygen-containing gas to the partial oxidation catalyst have to change rapidly and deviations from the desired oxygen/carbon ratio have to be corrected quick and accurately.

Flow meters that are able to measure the actual flow rate at the required time scale, i.e. typically in the order of 1 to 100 milliseconds, are not available or extremely expensive.

Since the oxygen/carbon ratio of the feed mixture strongly influences the reaction temperature, it is possible to monitor the oxygen/carbon ratio by monitoring the reaction temperature.

Reaction temperatures can be measured and monitored by various methods known in the art. Thermocouples are well known for temperature measurement, also at relatively high temperatures. They are reliable and normally have a long service life.

In U.S. Pat. No. 5,939,025 for example, the use of thermocouples to record changes in temperature in a catalytic partial oxidation reformer due to a step change in reactant flow is described.

However, due to their relatively slow response time, thermocouples are not adequate in systems wherein rapid changes occur. Since they cannot cope with the rapid changes, their use would lead to incorrect information and improper adjustments of the oxygen/carbon ratio.

Thus, there is a need for means that can quickly and reliably monitor the actual oxygen/carbon ratio in a catalytic oxidation process wherein the flow rates of the reactants are rapidly varied.

It has now been found that quick and reliable information about the actual oxygen/carbon ratio in the feed mixture can be obtained when use is made of the colour of or light intensity emitted by the upstream surface of the catalyst bed wherein catalytic oxidation is carried out.

The present invention therefore relates to a process for the catalytic oxidation of a hydrocarbonaceous fuel into a conversion product, wherein a feed mixture comprising the fuel and an oxygen-containing gas is contacted with a catalyst bed, which process further comprises the steps of:
(a) setting the flow rate of the fuel and the flow rate of the oxygen-containing gas, preferably in accordance with the demand of conversion product and a pre-determined value of the oxygen/carbon ratio in the feed mixture;
(b) determining the actual temperature of the upstream surface of the catalyst bed by means of a quick response device;
(c) generating an output signal that is a function of the difference between the actual temperature and a set point for the temperature; and
(d) using the output signal to adjust the flow rate of the fuel and/or of the oxygen-containing gas, preferably the flow rate of the fuel.

The process according to the present invention can suitably be applied under conditions of non-steady demand of conversion product, i.e. conditions wherein the amount of conversion product produced per unit of time has to vary and therewith the flow rates of the reactants. Even under process conditions requiring a turn-down ratio in demand of conversion product of up to 1:100, i.e. the maximum demand is a factor 100 higher than the minimum demand, the process of the present invention is particularly suitable in order to control the oxygen/carbon ratio in the feed mixture. Preferably, the turn-down ratio is in the range of from 1:10 to 1:100, more preferably in the range of from 1:30 to 1:80.

The process according to the invention will now be illustrated with reference to FIGS. 1 and 2.

FIG. 1 schematically shows a first embodiment of the adjustment of the flow rates in a catalytic partial CIA oxidation process according to the invention.

Figure 2:
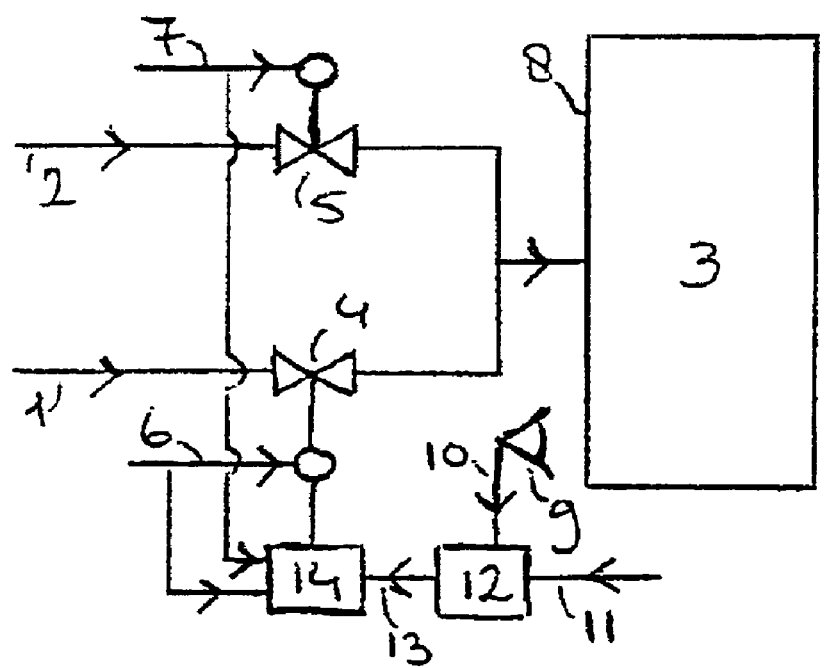

FIG. 2 schematically shows a second embodiment of the adjustment of the flow rates in a catalytic partial oxidation process according to the invention.

A hydrocarbonaceous fuel passes through line 1 and an oxygen-containing gas passes through line 2 and are mixed before contacting the catalyst bed 3. Both the flow rate of the hydrocarbonaceous fuel and of the oxygen-containing gas are set in accordance with the hydrogen demand and a pre-determined value of the oxygen-carbon ratio in the feed by adjusting means 4 and 5, respectively. Thereto, input signals 6 and 7, which are each determined by the hydrogen demand and the pre-determined value of the oxygen-carbon ratio, are fed to the adjusting means 4 and 5, respectively.

The amount of fuel needed per unit of time, and thus the desired flow rate of the fuel, largely depends on the hydrogen demand. It will be appreciated that the flow rate of the fuel and the flow rate of the oxygen-containing gas are correlated via the desired oxygen/carbon ratio in the feed, i.e. the pre-determined value of the oxygen/carbon ratio.

In a catalytic partial oxidation process, the desired oxygen/carbon ratio will be substantially constant over a wide range of hydrogen demand. It will be appreciated, however, that the desired oxygen/carbon ratio is to some extent dependent of the hydrogen demand. For example, at low hydrogen demand, and thus low throughput of the reactants, heat losses are relatively high and it may be desired to produce extra heat by using a higher oxygen/ carbon ratio in the feed mixture. The skilled person is familiar with such effects.

The setting of the flow rates in accordance with the hydrogen demand and the pre-determined value of the oxygen/carbon ratio may however lead to slight deviations of the actual oxygen/carbon ratio from the pre-determined value of the oxygen/carbon ratio. In order to correct such deviations, the actual temperature of the upstream surface 8 of the catalyst bed 3 is determined by means of a quick response device 9.

A signal 10 representing the actual temperature as determined by device 9 and a signal 11 representing a set point for the temperature are fed to control unit 12 and an output signal 13 is generated as a function of the difference between the actual temperature and the set point for the temperature. The output signal 13 is fed to adjusting means 4 in order to adjust the flow rate of the fuel. Control unit 12 may be any data processor capable of receiving signals within the time frame applicable in determining the temperature of the upstream surface of the catalyst bed.

In the embodiment of the process shown in FIG. 1, the output signal 13 is used to adjust the flow rate of the fuel. Alternatively, the output signal may be used to adjust the flow rate of the oxygen-containing gas or of both the fuel and the oxygen-containing gas.

Signals 6 and 13 may be fed to the same adjusting means in order to set and adjust the flow rate of the fuel, such as shown in FIG. 1. Alternatively, signals 6 and 13 may be fed to different adjusting means in line 1 in order to set and adjust the flow rate of the fuel, respectively.

In the embodiment of the process shown in FIG. 1, the fuel flow rate is adjusted by means of feedback control, i.e. the output signal 13 is directly used to adjust the fuel flow rate. The flow rate is thus adjusted in reaction on the actual temperature of the upstream surface of the catalyst as determined by quick response device 9.

Preferably, the flow rate of the fuel or the oxygen-containing gas is adjusted by means of a combined feedforward and feedback control, such as illustrated in FIG. 2. In this so-called pro-active feedback mode, information on temperature deviations during a transient is used to pro-actively adjust the flow rate during a later transient. Thereto, output signal 13 is fed to feedforward control unit 14. In feedforward control unit 14, output signal 15 is generated using the input signals 6 and 7, and the information contained in output signal 13 generated during an earlier, similar transient. Output signal 15 is directly fed to adjusting means 4 to adjust the flow rate of the fuel.

The adjusting means may be any means known in the art, for example an adjustable valve, injector or vaporiser, or a flow restriction. Preferably, the adjustment of the flow rate of the fuel and/or the oxygen-containing gas is carried out by means of a rapid response actuator. In a particularly preferred embodiment of the process according to the invention, the fuel flow rate is set and adjusted by adding the required amount of fuel to the stream of oxygen-containing gas flowing in line 2 by means of a pulsed liquid injector. Suitable pulsed liquid injection systems are known in the art and commercially available, for example from Bosch and Mitsubishi.

Such system is operated by setting the frequency and the width of the pulse. It is triggered by input signal 6 and output signal 13 or 15 and is capable of reacting quickly on those signals. It has been found that deviations from the desired oxygen/carbon ratio become smaller, and, hence, the performance in adjusting the fuel flow rate more sophisticated, when use is made of pulses having a smaller width and/or when the dead period between subsequent pulses is minimised. It has been found that the use of pulsed injection systems allows control of the oxygen/carbon ratio at high precision for turn down ratios in hydrogen demand of up to 1:100. Moreover, such systems are capable of maintaining adequate droplet size distribution even when atomisation is carried out under low flow rate conditions. The use of short, strong injections compensates for the lack of turbulence at relatively low fuel flow rates. Such pulsed liquid injection systems normally include a mixing chamber, in which the liquid is injected into another stream. The volume of the mixing chamber is suitable such that the residence time of the liquid is several times the dead period between the pulses.

In the process according to the present invention, the temperature of the upstream surface of the catalyst bed is determined, since at this location, the temperature is, for a given throughput of fuel, closely related to the oxygen/carbon ratio in the feed mixture. Due to the fact that catalytic oxidation reactions proceed at very short contact times, the oxidation reactions mainly takes place in the upstream layer of the catalyst bed and the temperature in that layer reflects the stoichiometry of that reaction as expressed by the oxygen/carbon ratio and also reflects changes in that ratio. At more downstream locations in the bed, these changes in temperature are damped due to the thermal mass of the catalyst and can thus not be monitored.

The temperature of the upstream surface is determined by means of a quick response device in order to be able to monitor rapid changes in temperature. Preferably, the temperature determination is carried out within a time frame of up to 100 milliseconds, more preferably of from 1 to 100 milliseconds, even more preferably of from 5 to 30 milliseconds.

It is important that the quick response device does not disturb the actual temperature of the upstream surface of the catalyst bed and that it determines the temperature of the surface and not that of the gas phase. For that reason, and apart from the fact that they have a slow response, thermocouples are not suitable to be used in the process of the present invention for determination of the upstream surface temperature. A thermocouple will disturb the surface temperature and the measured temperature will typically reflect a temperature that lies between the temperature of the gas phase and that of the surface.

A suitable means for quick and reliable determination of the temperature of the upstream surface comprises a photo detecting device, such as an optical pyrometer. Such apparatus operates on the basis of measuring the colour of or light intensity emitted by a surface using an optical fibre. The light intensities measured are converted via amplifiers and A-D current converters into a signal which can be processed in a control unit. Pyrometers are suitably made of glass or quartz, e.g. in the form of a glass rod or a glass fibre and may contain a silicon chip or other recording device capable of receiving and transmitting data.

During normal operation of a catalytic partial oxidation process, the upstream surface of the catalyst bed is glowing and changes in the oxygen/carbon ratio will influence the intensity and the wavelength of the light emitted by the glowing catalyst surface. The time involved in determining the temperature using a pyrometer is in the order of 1–100 milliseconds, preferably in the range between 5 and 30 milliseconds. This is sufficient to allow a quick measurement to start adjustment of the flow rate, if necessary.

Best results will be obtained when, instead of the absolute light intensity, the ratio between the light intensities emitted in different wavelength ranges is measured, preferably in two different wavelength ranges. This type of measurement is advantageous in that it reduces or even eliminates unwanted influences such as the position of reactor parts near the upstream surface, e.g. a diaphragm when used to shield part of the surface of the catalyst, or the presence of some local "dead spots" on the catalyst surface or the occurrence of achromatic fouling. Dual-wavelength pyrometers are commercially available from a number of companies and can be operated within the temperature ranges and wavelengths envisaged for the process according to the present invention.

It has been found that good results can be obtained when the colour or light intensity measurements are carried out using a pyrometer operable in the wavelength range of from 700 to 1000 nm (near infrared), as this is the range of highest sensitivity for changes in colour for silicon-type photodetection. Preference is given to measurements performed in the 700 to 950 nm range.

Calibration of the optical pyrometer, i.e. recording the relationship between light intensity or colour and temperature may be carried out before the pyrometer is used in the present process. Calibration and re-calibration may also be carried out during operation of the present process during periods wherein the process conditions are stationary or quasi stationary, by measuring the temperature downstream of or in the downstream part of the catalyst bed. Reference herein to stationary or quasi-stationary conditions is to conditions during which the temperature variations of the catalyst bed are less than 20° C./minute. For instance, when a vehicle is operated in a constant mode, i.e. demanding the same amount of electricity, and hence, hydrogen, over a period of time which is at least longer than the slowest response time, calibration can be carried out conveniently. For calibration purposes, a conventional temperature measurement device, such as a thermocouple, may be used to measure the downstream temperature. In practice, one will observe an offset in temperature between the upstream layer of the catalyst bed and the downstream part thereof. The magnitude of the offset will depend inter alia on the occurrence of different reactions, such as water-gas shift reactions or endothermic reforming reactions, in the downstream part of the catalyst bed and on the construction of the catalytic system applied. This does not play a major role in the proper calibration of the quick response device. Those skilled in the art will be familiar with such effects.

It will be clear that during start-up of the process of the invention, the upstream surface of the catalyst bed does not (yet) glow and is therefore not capable of emitting light having the wavelengths on which the monitoring system is based. Therefore, at start-up, an estimate of the flow rates of fuel and oxygen-containing gas needed to cause the catalyst bed to start glowing will be made. At a certain signal/noise ratio adjustment of the flow rate according to the invention will be carried out.

The process according to the invention may be operated by setting the set point for the temperature independently from the hydrogen demand and the desired oxygen/carbon ratio. Preferably, however, the set point for the temperature is determined by the hydrogen demand and the predetermined oxygen/carbon ratio. It will be appreciated that the predetermined oxygen/carbon ratio may to some extent depend on the hydrogen demand.

It will be appreciated that the dependency of the temperature of the upstream surface on the hydrogen demand and oxygen/carbon ratio can change, for example due to degradation of the catalyst. Such changes may be taken into account by adjusting the set point for the temperature. Data for the required adjustment may be obtained by measuring process features, for example temperature or pressure, occurring downstream of the catalyst bed during periods of stationary or quasi stationary process conditions, i.e. wherein the flow rates and the oxygen/carbon ratio are substantially constant.

The process according to the invention is not only particularly suitable for controlling the oxygen/carbon ratio in catalytic oxidation processes wherein the demand of conversion products, and thus the fuel flow rate, is varying, but also for controlling the oxygen/carbon ratio in catalytic oxidation processes wherein the fuel composition, and thus the carbon content, is varying. This is for instance the case when using off-shore gas as fuel.

The catalytic oxidation process according to the invention is preferably a catalytic partial oxidation process. Catalytic partial oxidation processes are typically carried out by contacting a feed mixture comprising a hydrocarbonaceous feedstock and an oxygen-containing gas with a suitable catalyst, preferably in amounts giving an oxygen/carbon ratio in the range of from 0.3 to 0.8, more preferably of from 0.45 to 0.75, even more preferably of from 0.45 to 0.65. References herein to oxygen/carbon ratio are to the ratio of oxygen in the form of molecules $O_2$ to carbon present in the fuel.

The feed mixture may comprise steam and/or carbon dioxide. If steam is present in the feed mixture, the steam/carbon ratio, i.e. the ratio of molecules of steam ($H_2O$) to carbon in the fuel, is preferably in the range of from above 0.0 to 3.0, more preferably of from above 0.0 to 2.0.

The hydrocarbonaceous fuel may comprise hydrocarbons and/or oxygenates which are gaseous at the temperature and pressure prevailing in the catalyst bed during normal operation of the catalytic partial oxidation process. Particular suitable fuels comprise hydrocarbons which are gaseous or liquid under standard conditions of temperature and pressure (STP, i.e. at 0° C. and 1 atmosphere), such as natural gas, naphtha, kerosene, or gas oil. Reference herein to oxygenates is to molecules containing, apart from carbon and hydrogen atoms, at least one oxygen atom which is linked to either one or two carbon atoms or to a carbon atom and a hydrogen atom, such as alcohols, ethers, acids and esters.

Reference herein to an oxygen-containing gas is to a gas containing molecular oxygen, for example air, substantially pure oxygen or oxygen-enriched air. The oxygen-containing gas preferably is air.

The temperature prevailing in a catalytic partial oxidation process is typically in the range of from 750 to 1500° C., preferably of from 800 to 1350° C., more preferably of from 850 to 1300° C. Reference herein to temperature is to the temperature in the upstream layer of the catalyst bed.

The catalytic partial oxidation process is typically operated at a pressure in the range of from 1 to 100 bar (absolute), preferably in the range of from 1 to 50 bar (absolute), more preferably of from 1 to 10 bar (absolute).

In the catalytic partial oxidation process in accordance with the present invention, the throughput of feed mixture and thus the gas hourly space velocity, expressed as normal liters of gas per kilogram of catalyst per hour, can be varied, depending on the hydrogen demand as triggered by the electricity needed by the motorist. At maximum feed throughput, the feed mixture is preferably contacted with the catalyst bed at gas hourly space velocities which are in the range of from 20,000 to 10,000,000 Nl/kg/h, more preferably in the range from 50,000 to 5,000,000 Nl/kg/h, even more preferably in the range of from 100,000 to 3,000,000 Nl/kg/h. Reference herein to normal liters is to liters at STP.

Catalyst compositions suitable for use in catalytic partial oxidation are known in the art. Such catalysts generally comprise, as catalytically active component, a metal selected from Group VIII of the Periodic Table of the Elements. Catalysts comprising, as the catalytically active component, a metal selected from rhodium, iridium, palladium and platinum are preferred. Catalysts comprising rhodium and/or iridium are most preferred.

The catalytically active metal is most suitably supported on a carrier, such as refractory oxide particles, monolith structures, or metallic arrangements such as metal gauzes or arrangements of metal wires. Suitable carrier materials are well known in the art and include refractory oxides, such as silica, alumina, titania, zirconia and mixtures thereof, and aluminium-containing high-temperature resistant alloys.

Typically, the catalyst comprises the active metal in an amount in the range of from 0.01 to 20% by weight, based on the weight of carrier material, preferably from 0.02 to 10% by weight, more preferably from 0.1 to 7.5% by weight.

The catalytic partial oxidation process according to the present invention is suitably used to prepare hydrogen or a mixture of hydrogen and other gases from any hydrocarbonaceous feedstock. Preferably, the process according to the present invention is directed at producing hydrogen from fuel, in particular at the onboard production of hydrogen in fuel cell powered transport means, such as automotive vehicles and crafts.

Accordingly, the present invention also relates to transport means comprising a system for the catalytic partial oxidation that is operated as hereinabove defined.

What is claimed is:

1. A process for the catalytic oxidation of a hydrocarbonaceous fuel into a conversion product under conditions of non-steady demand of conversion product, wherein a feed mixture comprising the fuel and an oxygen-containing gas is contacted with a catalyst bed, the process comprising:

(a) setting the flow rate of the fuel and the flow rate of the oxygen-containing gas in accordance with the demand of conversion product and a pre-determined value of the oxygen/carbon ratio in the feed mixture;

(b) determining the actual temperature of the upstream surface of the catalyst bed by measuring the ratio between the light intensities emitted by the upstream surface of the catalyst bed at different wavelength ranges by means of a quick response device comprising an optical pyrometer;

(c) generating an output signal that is a function of the difference between the actual temperature and a set point for the temperature; and, (d) using the output signal to adjust the flow rate of the fuel.

2. The process of claim 1, wherein the turn-down ratio in demand of conversion product is in the range of from between 1:10 to between 1:100.

3. The process of claim 1, wherein the set point for the temperature is determined by the value of the oxygen/carbon ratio in the feed mixture and by the demand of conversion product.

4. The process of claim 1, wherein the catalytic oxidation process is a catalytic partial oxidation process and wherein the conversion product is a hydrogen-containing gas.

5. The process of claim 1, wherein the light intensity is measured at wavelengths in the range of from between 700 to between 1000 nm.

6. The process of claim 1, wherein the adjustment of the flow rate in step (d) is carried out by means of a rapid response actuator.

7. The process of claim 6, wherein the adjustment of the flow rate of the fuel is carried out by means of a pulsed liquid injection system.

8. A transport means comprising a system for the catalytic partial oxidation of a fuel, which system comprises:

a catalyst bed having an upstream surface and a downstream surface;

a first line controlled by a first adjusting means; and, a second line controlled by a second adjusting means, wherein a hydrocarbonaceous fuel passes through the first line and an oxygen-containing gas passes through the second line and such gases are mixed before contacting the catalyst bed;

an optical pyrometer connected to a control unit which is connected to the first adjusting means and/or the second adjusting means, wherein the optical pyrometer measures the actual temperature of the upstream catalyst surface to produce a signal and such signal is fed into a control unite to produce an output signal which is fed into the first adjusting means and/or the second adjusting means in order to control such adjusting means, wherein such system is operating under a non-steady state demand of conversion product.

* * * * *